(12) United States Patent
Iwanami et al.

(10) Patent No.: US 6,993,910 B2
(45) Date of Patent: Feb. 7, 2006

(54) FLUID MACHINE

(75) Inventors: Shigeki Iwanami, Okazaki (JP);
Yasushi Suzuki, Chiryu (JP); Keiichi Uno, Kariya (JP); Kazuhide Uchida, Hamamatsu (JP); Tadashi Hotta, Okazaki (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 0 days.

(21) Appl. No.: 10/862,348

(22) Filed: Jun. 8, 2004

(65) Prior Publication Data
US 2004/0258539 A1 Dec. 23, 2004

(30) Foreign Application Priority Data
Jun. 17, 2003 (JP) .............................. 2003-171993

(51) Int. Cl.
*F01K 13/00* (2006.01)
*F04B 17/00* (2006.01)
(52) U.S. Cl. ...................... 60/645; 417/374; 417/410.5
(58) Field of Classification Search ................. 60/645;
417/299, 310, 374, 410.5, 440
See application file for complete search history.

(56) References Cited
U.S. PATENT DOCUMENTS
6,234,769 B1 * 5/2001 Sakai et al. ................. 417/374

6,619,934 B2 * 9/2003 Loprete et al. .......... 417/410.5
6,659,738 B2 * 12/2003 Iwanami et al. ............. 417/374

OTHER PUBLICATIONS

U.S. Appl. No. 10/764,534, filed Jan. 27, 2004, Iwanami et al.
U.S. Appl. No. 10/844,329, filed May 13, 2004, Iwanami et al.

* cited by examiner

*Primary Examiner*—Hoang Nguyen
(74) *Attorney, Agent, or Firm*—Posz Law Group, PLC (57) ABSTRACT

An object of the invention is to minimize energy loss to be generated at a driving shaft and a shaft seal device, when an electric rotating device is driven by an expansion-and-compressor device. According to a feature of the invention, a first driving shaft is rotationally supported by a housing and transmits a driving force from an engine to a second shaft of the expansion-and-compressor device, wherein a shaft seal device is provided on the first driving shaft for air-tightly sealing the inside of the housing from the outside of the housing. A power transmission control device (electromagnetic clutch or one way clutch) is operatively provided in a path between the first driving shaft and the second shaft, so that power transmission from the second shaft to the first driving shaft is cut off, to suppress any energy loss to be generated between the first driving shaft and the shaft seal device.

14 Claims, 5 Drawing Sheets

FLUID MACHINE

CROSS REFERENCE TO RELATED APPLICATION

This application is based on Japanese Patent Application No. 2003-171993 filed on Jun. 17, 2003, the disclosures of which is incorporated herein by reference.

FIELD OF THE INVENTION

The present invention relates to a fluid machine having both a pumping and a motor functions, wherein the motor function is to convert an inside energy of working fluid to a rotational energy by expanding superheated gas in an isentropic manner, and the pumping function is to suck in and compress the working fluid.

BACKGROUND OF THE INVENTION

Figure 6:
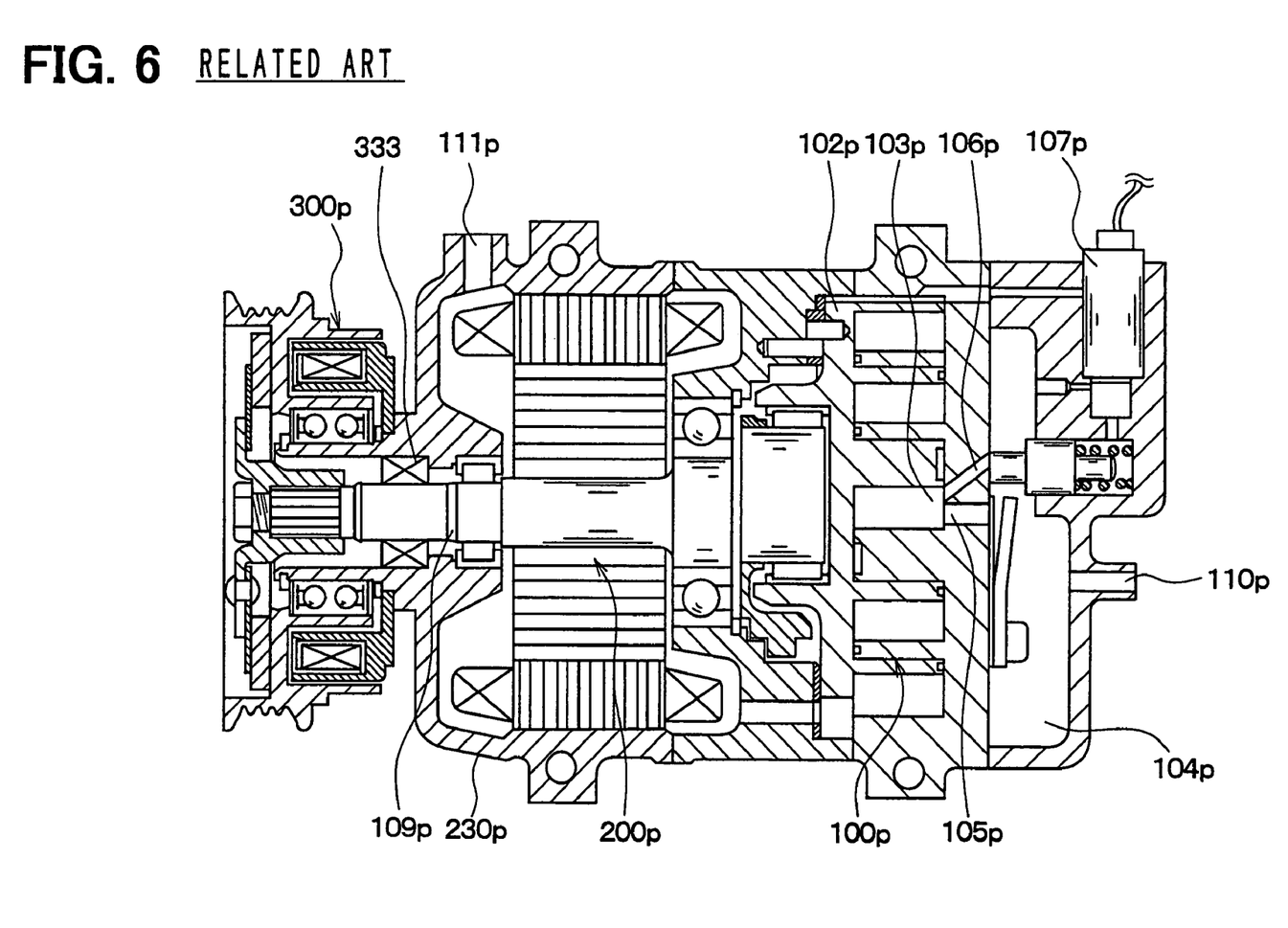
FIG. 6 is a cross-sectional view of a fluid machine proposed by the inventors in the course of developing the present invention.

A fluid machine shown in FIG. 6 is a fluid machine proposed by the inventors of the present invention in the course of developing the present invention. The fluid machine has a pumping mode for compressing and discharging working fluid, and a motor mode for converting fluid pressure to kinetic energy and thereby to output mechanical energy. The fluid machine operates in the following manner.

[Pumping Mode]

In this operational mode, a movable scroll 102p of a pump-motor mechanism 100p is rotated by applying a rotational force to a shaft 109p, to thereby suck in and compress refrigerant.

More in detail, the shaft 109p is rotated while an electromagnetic valve 107p and an inlet port 106p are closed. An expansion-and-compressor device, namely the fluid machine, sucks in the refrigerant from a low pressure port 111p, compresses the same by working chambers 103p, pumps out pressurized refrigerant through a pump-out port 105p into a high pressure chamber 104p and discharges the pressurized refrigerant through a high pressure port 110p, in the same manner to a well known scroll type compressor.

There are two ways for applying the rotational force to the shaft 109a, according to one of which the expansion-and-compressor device is disconnected from an engine by cutting off power supply to an electromagnetic clutch 300p and the rotational force is applied from an electric rotating machine 200p to the shaft 109a, and according to the other of which the expansion-and-compressor device is operatively connected to the engine and driven by the rotational force from the engine.

[Motor Mode]

In this operational mode, the movable scroll 102p is rotated by introducing superheated steam of the refrigerant into the high pressure chamber 104p and expanding the superheated gas by the pump-motor mechanism 100p, while the expansion-and-compressor device is disconnected from the engine by means of the electromagnetic clutch 300p. The rotation of the movable scroll 102p is transmitted to the shaft 109p to obtain a mechanical output.

In the fluid machine explained above, it is necessary to air-tightly seal a gap between the shaft 109a and a housing 230p of the fluid machine, for example by a shaft seal device 333 such as a lip seal, because the shaft 109a extends from the outside into the inside of the housing 230p.

Since the air-tightness at the gap between the shaft 109a and the housing 230p is obtained by the shaft seal device 333, in which the shaft seal device 333 is pressed against an outer peripheral surface of the shaft 109a at a certain contact pressure, an energy loss will be generated due to friction resistance at the shaft seal device 333 when the shaft 109a is rotated.

Accordingly, an efficiency of energy collection will be decreased in the above described fluid machine, because the energy to be collected is decreased in the motor mode operation.

Figure 7:
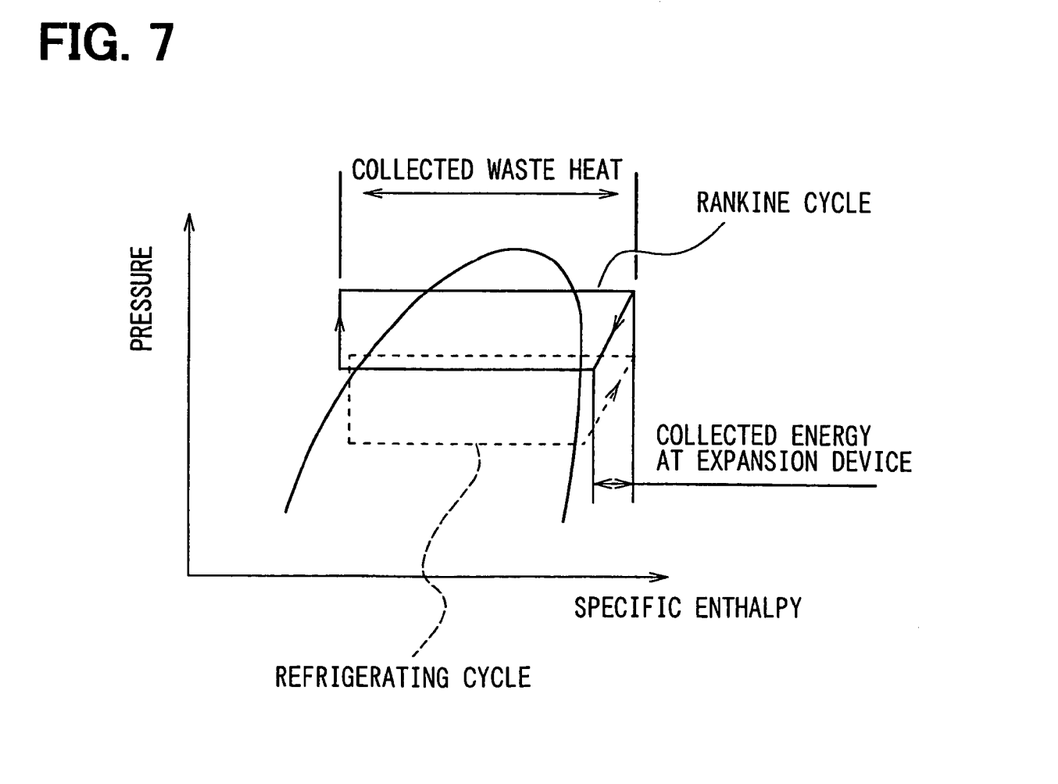
FIG. 7 is a p-h diagram.

The maximum energy to be collected in the motor mode operation is smaller in comparison with collected heat quantity, as seen from p-h diagram shown in FIG. 7. Accordingly, the energy loss at the shaft seal device 333 for the energy collection occupies a relatively large portion of the maximum energy to be collected.

SUMMARY OF THE INVENTION

It is, therefore, an object of the present invention, in view of the above mentioned problems, to provide a fluid machine which can operate with less energy loss.

According to a feature of the present invention, a fluid machine has an expansion-and-compressor device which selectively operates as an expansion device for collecting waste heat energy from an internal combustion engine and for converting the collected heat energy into mechanical rotational force, or as a compressor for compressing refrigerant for an air-conditioner. The fluid machine further has an electric rotating device disposed in a housing for the expansion-and-compressor device and operatively connected thereto, so that the electric rotating device is operated as an electric motor for generating a rotational force to drive the expansion-and-compressor device when the electric power is supplied thereto, or the electric rotating device is operated as an electric power generator for generating electric power when it is driven by the expansion-and-compressor device. A first driving shaft is rotationally supported by the housing and operatively connected to an outside driving source (an engine), and a second shaft is operatively connected to the expansion-and-compressor device, so that the driving force is transmitted from the engine to the expansion-and-compressor device, wherein a shaft seal device is provided on the first driving shaft for air-tightly sealing the inside of the housing from the outside of the housing. A power transmission control device (electromagnetic clutch or one way clutch) is operatively provided in a path between the first driving shaft and the second shaft, so that power transmission from the second shaft to the first driving shaft is cut off.

According to this feature of the invention, the first driving shaft will not be rotated when the electric rotating device is driven by the rotational force from the expansion-and-compressor device so that any energy loss to be generated between the first driving shaft and the shaft seal device can be suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 2:
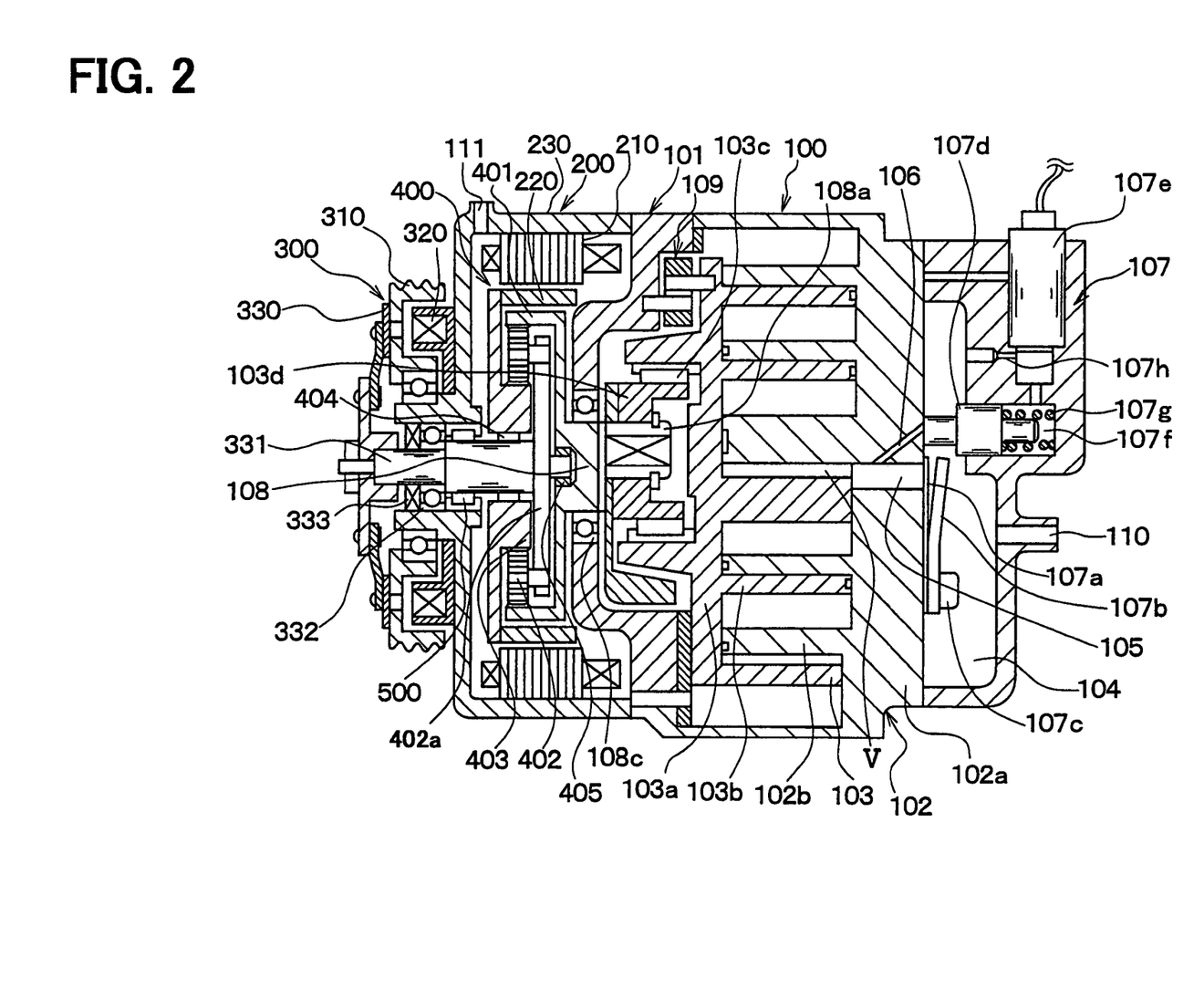
FIG. 2 is a cross-sectional view of a fluid machine according to a first embodiment of the present invention.
Figure 3:
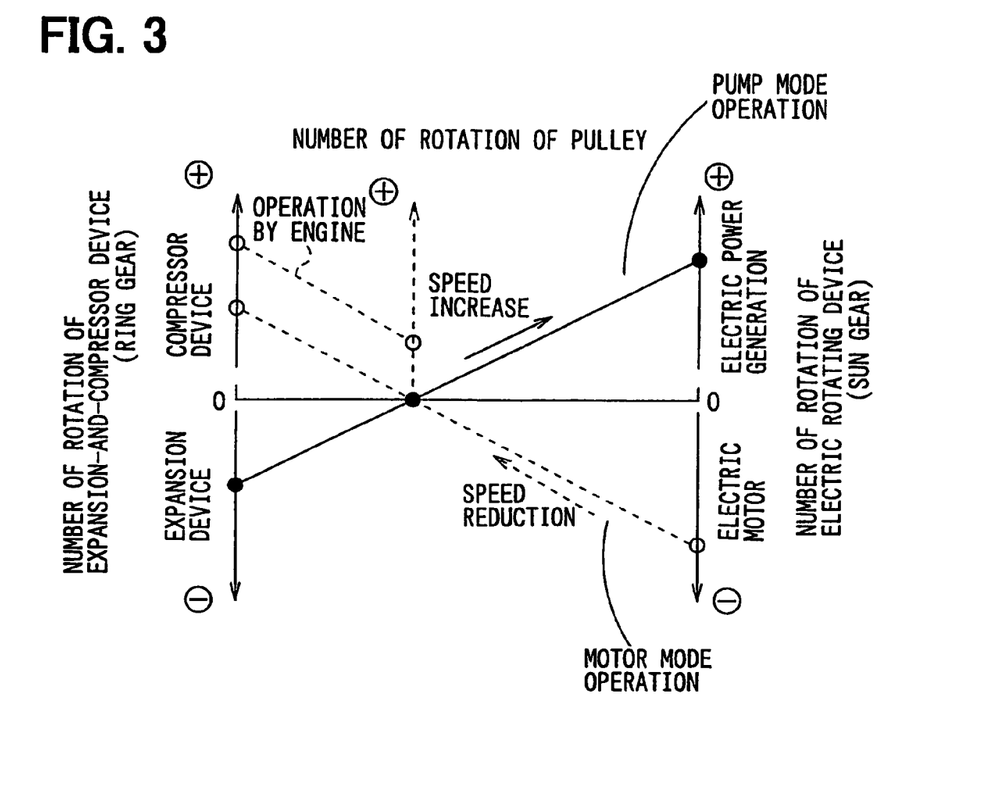
FIG. 3 is a chart showing an operation of the fluid machine according to the first embodiment.

A first embodiment of the present invention will now be explained with reference to FIGS. 1 through 3. A fluid machine of the present invention is used to, for example, a motor vehicle, which is equipped with an air-conditioning system and a waste heat utilizing system. The waste heat utilizing system is composed of a Rankine cycle, which collects waste heat from an internal combustion engine for generating a running power for the motor vehicle. In addition, in the fluid machine of the present invention, the heat generated by the fluid machine is utilized for performing an air-conditioning operation for the motor vehicle.

Figure 1:
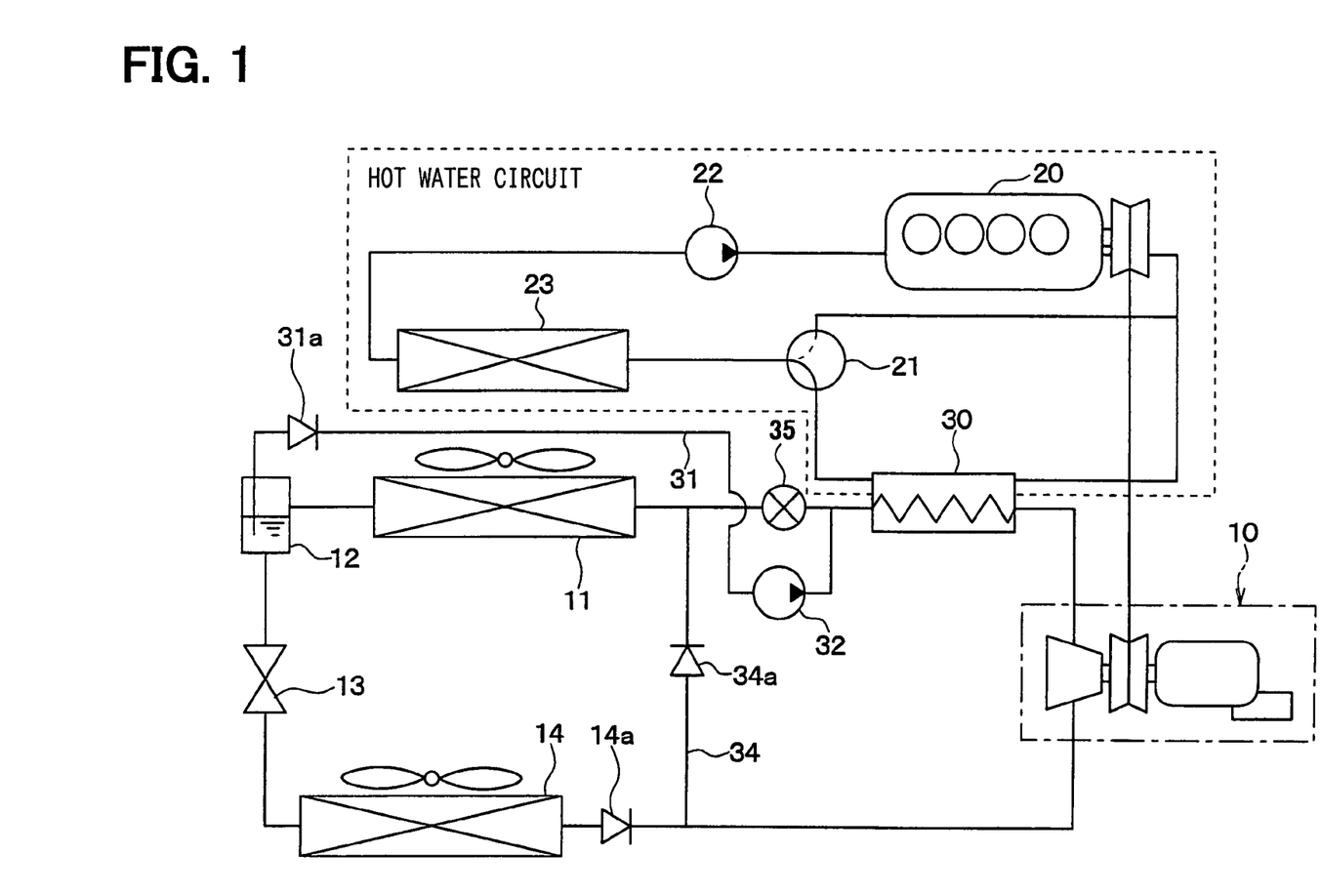
FIG. 1 is a schematic diagram showing a refrigerating cycle and a waste heat collecting cycle to which a fluid machine according to the present invention is applied.

In FIG. 1, a reference numeral 10 designates a fluid machine comprising an expansion-and-compressor device, so that the fluid machine operates as a compressor for compressing a gas-phase refrigerant (this is referred to as a pump mode operation) and also as a power generator for generating a mechanical driving force by converting fluid pressure of superheated steam into kinetic-energy (this is referred to as a motor mode operation). A reference numeral 11 designates a heat radiating device connected to an outlet side of the fluid machine 10 for cooling down the refrigerant gas by heat radiation (The heat radiating device 11 will be also referred to as a condenser).

A reference numeral 12 designates a receiver for dividing the refrigerant from the condenser 11 into a gas-phase refrigerant and a liquid-phase refrigerant. A reference numeral 13 is an expansion valve of a temperature-dependent type for expanding and decreasing the pressure of the liquid-phase refrigerant from the receiver 12, more particularly for decreasing the pressure of the refrigerant in an isenthalpic manner and controlling an opening degree of a passage for the refrigerant so that the degree of superheat of the refrigerant to be sucked into the fluid machine 10 will be maintained at a predetermined value when the fluid machine 10 is operating in the pump mode operation.

A reference numeral 14 designates a heat absorbing device (also referred to as an evaporator) for evaporating the refrigerant from the expansion valve 13 and thereby absorbing heat. The above fluid machine 10, the condenser 11, the receiver 12, the expansion valve 13 and the evaporator 14 constitute a refrigerating cycle.

A heating device 30 is disposed in a refrigerant passage connected between the fluid machine 10 and the condenser 11 and heats the refrigerant flowing through the refrigerant passage by heat-exchanging the refrigerant with engine cooling water flowing through the heating device 30. A switching valve 21 of a three-way valve is provided in a circuit (Hot water circuit) for the engine cooling water, so that the flow of the cooling water through the heating device 30 is switched on and off.

A first by-pass passage 31 is connected between the receiver 12 and the heating device 30 so that the liquid-phase refrigerant will flow from the receiver 12 to an inlet side of the heating device 30 when a liquid pump 32 is operated. A check valve 31a is provided in this first by-pass passage so that only the flow of the refrigerant from the receiver 12 to the heating device 30 is allowed. The liquid pump 32 in this embodiment is an electrically driven pump.

A second by-pass passage 34 is connected between the outlet side of the fluid machine 10 and the inlet side of the condenser 11 and a check valve 34a is disposed in this passage, so that the refrigerant is allowed to flow from the fluid machine 10 to the condenser 11, only when the fluid machine 10 is operated in the motor mode operation.

A check valve 14a is provided in the refrigerating cycle so that the refrigerant is allowed to flow from the outlet side of the evaporator 14 to the inlet side of the fluid machine 10 when the fluid machine 10 is operated in the pump mode operation. An ON-OFF valve 35 is an electromagnetic type for opening and closing the passage for the refrigerant passage, wherein the valve 35 and the switching valve 21 are controlled by an electronic control unit (not shown).

A water pump 22 circulates the engine cooling water, and a radiator 23 is a heat exchanger for heat-exchanging the heat of the engine cooling water with the ambient air to cool down the engine cooling water. A by-pass passage for by-passing the radiator 23 and a valve for controlling an amount of the engine cooling water flowing through the radiator 23 are omitted in FIG. 1.

The water pump 22 is a mechanical type pump driven by the engine 20 in this embodiment. It is, however, possible to replace it with an electric type pump operated with an electric motor.

Now, the fluid machine 10 will be explained with reference to FIG. 2. The fluid machine 10 according to the embodiment comprises the expansion-and-compressor device 100 for selectively expanding or compressing the refrigerant (the gas-phase refrigerant in this embodiment), an electric rotating device 200 for generating an electric power when a rotational force is applied thereto and for generating a rotational force when the electric power is applied thereto, an electromagnetic clutch 300 for controlling (switching on and off) a power transmission of a rotational force from the engine 20 to the expansion-and-compressor device 100, and a transmission device 400 comprising a planetary gear drive for changing a path for the power transmission among the expansion-and-compressor device 100, the electric rotating device 200 and the electromagnetic clutch 300 and for increasing and decreasing the rotational speed to be transmitted.

The electric rotating device 200 comprises a stator 210 and a rotor 220 rotating within a space of the stator 210, wherein a winding is wound on the stator 210 and a permanent magnet is fixed to the rotor 220.

When the electric power is supplied to the stator 210, the rotor 220 will be rotated to operate as an electric motor so that it drives the expansion-and-compressor device 100, whereas it will operate as an electric power generator when a rotational force is applied to the rotor 220.

The electromagnetic clutch 300 comprises a pulley 310 to be connected to the engine 20 via a V-belt, an electromagnetic coil 320 and a friction plate 330 which will be displaced by an electromagnetic force generated at the electromagnetic coil 320 when it is energized. The coil 320 will be energized when the rotational force from the engine 20 will be transmitted to the fluid machine 10, and the supply of the electric power to the coil 320 will be cut off when the power transmission of the rotational force to the engine shall be cut off.

The expansion-and-compressor device 100 has the same construction to a well known scroll type compressor, and comprises a middle housing 101 fixed to a stator housing 230 of the electric rotating device 200, a fixed scroll 102 connected to the middle housing 101, and a movable scroll 103 disposed in a space defined by the middle housing 101 and the fixed housing 102. The movable scroll 103 is rotated in the space with an orbit motion to form multiple working chambers V. The device 100 further comprises a high pressure chamber 104, passages 105 and 106 operatively communicating the working chamber V with the high pressure chamber 104, and a valve mechanism 107 for controlling an opening and closing of the passage 106.

The fixed scroll 102 comprises a base plate 102a and a spiral scroll wrap 102b protruding from the base plate 102a towards the middle housing 101, whereas the movable scroll likewise has a base plate 103a and a spiral scroll wrap 103b protruding from the base plate 103a towards the fixed scroll, wherein wall portions of the spiral scroll wraps 102b and 103b are contacted with each other to form the working chambers V. When the movable scroll 103 is rotated, the space of the working chamber V will be expanded or decreased.

A shaft 108 (a second shaft) is rotationally supported by the middle housing 101 and provided with an internal gear 401, which is a part of the transmission device 400. The shaft 108 is further provided with an eccentric shaft 108a which is eccentric from a rotational axis of the shaft 108 to operate as a crank arm and operatively connected to the movable scroll 103 over a bush 103d and a bearing 103c.

The bush 103d is connected to the eccentric shaft 108a in such a way that the bush 103d can be displaced by a certain small distance in a plain perpendicular to the axis of the eccentric shaft 108a, so that the movable scroll 103 will be displaced in a direction that contact pressure between the scroll wraps 102b and 103b will be increased by means of a reaction force for compression.

A reference numeral 109 designates an auto rotation preventing mechanism for preventing the autorotation of the movable scroll 103 and allowing the orbital motion thereof. When the shaft 108 is rotated by one revolution, the movable scroll 103 is moved around the shaft 108 with the orbital motion, and the volume of the working chamber V will be decreased as the working chamber is moved from the outer position to the inner position. The mechanism 109 here comprises a ring and a pair of pins.

The passage 105 operates as an outlet port for pumping out the pressurized refrigerant by communicating the working chamber V, which will reach its minimum volume during the pump mode operation, with the high pressure chamber 104, whereas the passage 106 operates an inlet port for introducing high-temperature and high-pressure refrigerant, namely superheated steam of the refrigerant, from the high pressure chamber 104 into the working chamber V, the volume of which becomes at its minimum value during the motor mode operation.

The high pressure chamber 104 has a function of equalizing the pressure of the refrigerant by smoothing pulsation of the pumped out refrigerant. A high pressure port 110 is formed in a housing forming the high pressure chamber 104 and the port 110 is connected to the heating device 30 and the heat radiating device 11.

A low pressure port 111 is formed in the stator housing 230 for communicating a space defined by the stator housing 230 and the fixed scroll 102 with the evaporator 14 and the second by-pass passage 34.

A discharge valve 107a and a valve stopper 107b are fixed to the base plate 102a of the fixed scroll 102 by a bolt 107c, wherein the valve 107a is a check valve of a reed valve type for preventing the pumped out refrigerant from flowing back to the working chamber V from the high pressure chamber 104, and the stopper 107b is a plate for limiting the movement of the reed valve 107a.

A spool 107d is a valve for opening and closing the inlet port 106, an electromagnetic valve 107e is a control valve for controlling pressure in a back pressure chamber 107f by opening and closing a passage between back pressure chamber 107f and the high pressure chamber 104 or the space communicated with the low pressure port 111. A spring 107g is disposed in the back pressure chamber 107f to urge the spool 107d in a direction to close the inlet port 106, and an orifice 107h having a certain flow resistance is formed in the passage connecting the high pressure chamber 104 with the back pressure chamber 107f.

When the electromagnetic valve 107e is opened, the back pressure chamber 107f is communicated to the space defined by the stator housing 230 (the lower pressure side), then the pressure in the back pressure chamber 107f will be decreased lower than that in the high pressure chamber 104 and finally the spool 107d will be moved against the spring force of the spring 107g in a direction to open the inlet port 106. Since the pressure drop at the orifice 107h is so high that an amount of the refrigerant flowing from the high pressure chamber 104 into the back pressure chamber 107f is negligible small.

On the other hand, when the electromagnetic valve 107e is closed, the pressure in the back pressure chamber 107f becomes equal to that in the high pressure chamber 104 and then the spool 107d will be moved in the direction to close the inlet port 106. As above, the spool 107d, the electromagnetic valve 107e, the back pressure chamber 107f and the orifice 107h constitute a pilot-type electric valve for opening and closing the inlet port 106.

The transmission device 400 is composed of a planetary gear mechanism having a ring shape internal gear 401 (ring gear) integrally formed with and rotated with the shaft 108, multiple (e.g. three) planetary gears 402 supported by a planetary carrier 402a and being engaged with the ring gear 401, and a sun gear 403 being engaged with the planetary gears 402.

The sun gear 403 is integrally formed with the rotor 220 of the electric rotating device 200 and the planetary gears 402 are integrally fixed to a shaft 331 to which a friction plate 330 is connected.

A one-way clutch 500 allows a rotation of the shaft 331 only in one rotational direction, a bearing 332 rotationally supports the shaft 331, a bearing 404 rotationally supports the sun gear 403, namely the rotor 220 with respect to the shaft 331, a bearing 405 rotationally supports the internal gear 401 with respect to the shaft 108, and a bearing 108c rotationally supports the shaft 108 with respect to the middle housing 101.

A lip seal 333 is a seal for preventing the refrigerant from flowing out through a gap between the shaft 331 and the stator housing, 230, in which the lip seal is contacted with (pressed against) the outer peripheral surface of the shaft 331.

Now, an operation of the fluid machine as described above will be explained.

(Pump Mode Operation)

The pump mode operation is the operation in which a rotational force is applied to the shaft 108 and the expansion-and-compressor device 100 is thereby operated to compress the refrigerant by rotating the movable scroll 103 with the orbit motion. In this operation, the expansion-and-compressor device 100 is also referred to as the compressor device 100.

In this pump mode operation, the electromagnetic valve 107e is closed and thereby the inlet port 106 is closed. When the shaft 108 and the movable scroll 103 are rotated, the compressor device 100 sucks the refrigerant from the low pressure port 111, compresses the refrigerant by the working chamber V, pumps out the pressurized refrigerant to the high pressure chamber 104 through the outlet port 105, and finally discharges the high pressure refrigerant to the heat radiating device (condenser) 11 through the high pressure port 110. The refrigerant from the low pressure port 111 flows through the inside of the stator housing 230 and flows into the compressor device 100.

In this operation, there are two methods for applying the rotational force to the shaft 108, namely one of them is a method in which the supply of the electric power to the electromagnetic clutch 300 is cut off and thereby the compressor device 100 is mechanically disconnected from the pulley 310 and then the electric rotating device 200 is operated as the electric motor by supplying the electric power thereto so that the rotational force of the device 200 will be applied to the compressor device 100. In the other method, the compressor device 100 is mechanically connected to the engine 20 over the electromagnetic clutch 300, and the driving force from the engine 20 is applied to the compressor device 100.

In this operation, since the planetary carrier 402a is not rotated because of the one-way clutch 500, the rotational force of the electric rotating device 200 will be transmitted to the compressor device 100 through the transmission device 400 with the rotational speed being reduced thereby.

In the case that the electromagnetic clutch 300 is supplied with the electric power to mechanically connect the compressor device 100 with the engine 20 to transmit the rotational force from the engine 20 to the compressor device 100, the electric power is also supplied to the electric rotating device 200 to generate electromagnetic force at the stator and thereby to apply a torque to the rotor 220 so that the sun gear 403 and the rotor 220 may not be rotated.

As a result, the rotational force transmitted from the engine 20 to the electromagnetic clutch 300 (the pulley 310) will be further transmitted to the compressor device 100 through the transmission device 400 with the rotational speed being increased thereby.

(Motor Mode Operation)

The motor mode operation is the operation in which high pressure and superheated steam of the refrigerant, which is superheated by the heating device 30, is introduced into the expansion-and-compressor device 100 and the refrigerant is expanded in the working chamber V, so that a rotational force is generated by rotating the movable scroll 103 with the orbit motion in the different rotational direction to that for the pump mode operation. In this operation, the expansion-and-compressor device 100 is also referred to as the expansion device 100.

The rotational force generated at the expansion device 100 is-used for rotating the rotor 220 to generate the electric power at the electric rotating device 200, and the electric power will be charged into a battery.

More in detail, the supply of the electric power to the electromagnetic clutch 300 is cut off and the electromagnetic valve 107e is opened so that the inlet port 106 is also opened. Then the high pressure and superheated refrigerant heated by the heating device 30 will be introduced into the working chamber V through the inlet port 106 and the superheated refrigerant will be expanded in the working chamber V.

As a result, the movable scroll 103 will be rotated by the expansion of the superheated refrigerant, and the refrigerant which has been expanded and the pressure of which has been decreased will be discharged to the condenser 11 through the low pressure port 111.

In this operation, when the movable scroll 103 is rotated in the reversed direction to that of the pump mode operation, the planetary gears 402 (namely, the planetary carrier 402a) are urged to rotate likewise in the reversed direction around the shaft 331. However, since the rotation of the shaft 331 (the first shaft) in the reversed direction is restricted by the one way clutch 500, the planetary gears 402 and the planetary carrier 402a can not be rotated in the reversed direction around the shaft 331, while the planetary gears 402 will be rotated on their own axis.

Accordingly, the rotational energy given to the movable scroll 103 is transmitted to the rotor 220 of the electric rotating device 200 through the transmission device 400 with the rotational speed being increased. FIG. 3 shows a diagram explaining the above mentioned operation.

In this embodiment, the transmission device 400 and the one way clutch 500 constitute a power transmission control device.

As understood from the above operation, the electric rotating device 200 is arranged in a path of transmitting the driving force at such a point closer to the expansion-and-compressor device 100 than the power transmission control device (the transmission device 400 and the one way clutch 500).

An operation of the refrigerating cycle and the waste heat collecting cycle of the above mentioned embodiment will be explained.

(Air-conditioning Operational Mode)

The air-conditioning operational mode is an operational mode in which air is cooled down at the evaporator 14 and the heat of the refrigerant is radiated at the condenser 11.

In this operational mode, the operation of the liquid pump 32 is stopped, the ON-OFF valve 35 is opened and the device 100 is operated as the compressor device (pump mode operation). And the engine cooling water is circulated by by-passing the heating device 30 by means of the switching valve 21.

The refrigerant flows in this operational mode from and back to the compressor device 100 through the heating device 30, heat radiating device 11 (condenser), the receiver 12, the expansion valve 13, and the evaporator 14. In this flow of the refrigerant, the refrigerant will not be heated by the heating device 30 since the engine cooling water is flowing by by-passing it.

The low pressure refrigerant, which is decompressed at the expansion valve 13, will be evaporated at the evaporator 14 by absorbing the heat from the air flowing through the evaporator 14 and the cooled down air will be blown out into a passenger room of the motor vehicle. The evaporated gas-phase refrigerant will be again compressed by the compressor device 100 and the high temperature compressed refrigerant is then cooled down and condensed at the condenser 11.

Although Freon (HFC134a) is used as the refrigerant (working fluid) in this embodiment, any other refrigerant which will be liquidized at a higher pressure side can be used (not limited to HFC134a).

(Waste Heat Collecting Operational Mode)

This is an operational mode in which the operation of the air-conditioning is stopped, namely the operation of the compressor device 100 is stopped, and instead the waste heat from the engine 20 is collected and converted to mechanical energy.

In this operational mode, the liquid pump 32 is operated, the ON-OFF valve 35 is closed and the device 100 is operated as the expansion device (motor mode operation). And the engine cooling water is circulated through the heating device 30 by means of the switching valve 21.

The refrigerant flows in this operational mode from and back to the expansion device 100 through the second by-pass passage 34, heat radiating device 11, the receiver 12, the first by-pass passage 31, the pump 32 and the heating device 30. The flow of the refrigerant in the heat radiating device 11 is different from that for the pump mode operation.

As above, the superheated steam heated by the heating device 30 flows into the expansion device 100 and expanded therein so that the enthalpy of the refrigerant will be decreased in an isentropic manner. Accordingly, the electric power corresponding to an amount of decrease of the enthalpy will be charged into the battery.

The refrigerant from the expansion device 100 will be cooled down and condensed at the heat radiating device 11 and charged in the receiver 12. Then the liquid-phase refrigerant will be sucked from the receiver 12 by the liquid pump 32 and pumped out to the heating device 30. The liquid pump 32 pumps out the liquid-phase refrigerant at such a pressure that superheated steam at the heating device 30 may not flow in a backward direction.

As explained above, the shaft 331, with which the lip seal 333 is contacted, is not rotated in the motor mode operation because of the transmission device 400 and the one way clutch 500, so that energy collected by the expansion-and-compressor device 100 will not be lost by the lip seal 333.

(Second Embodiment)

Figure 4:
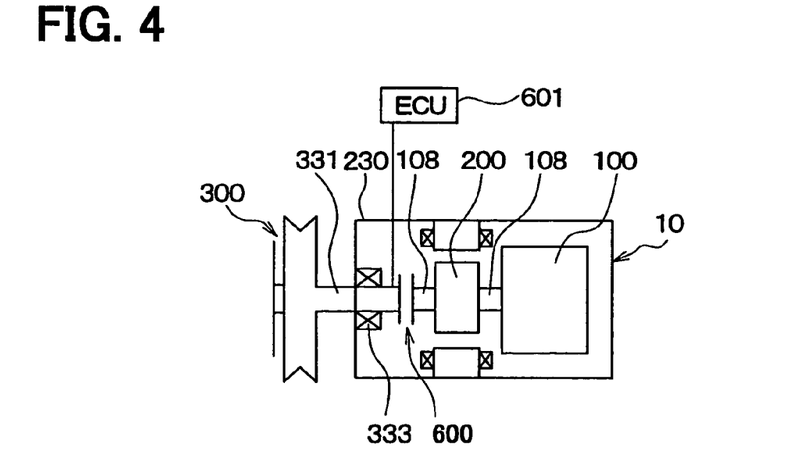
FIG. 4 is a schematic diagram showing a fluid machine according to a second embodiment of the present invention.

In the first embodiment, the power transmission control device is constituted by the transmission device 400 and the one way clutch 500. However, in the second embodiment, as shown in FIG. 4, an electromagnetic clutch 600 is arranged within the housing (for example, the stator housing 230) of the expansion-and-compressor device 100 and between the first and second shafts 331 and 108, and the supply of electric power to the electromagnetic clutch 600 is controlled by an electronic control unit 601.

In the motor mode operation and the pump mode operation in which the compressor device 100 is driven by the electric rotating device 200, the electric power to the electromagnetic clutch 600 is cut off to disconnect the second shaft 108 from the first shaft 331. In the pump mode operation in which the compressor device 100 is driven by the engine 20, the electric power is supplied to the electromagnetic clutch 600 to connect the shafts 108 and 331 with each other to transmit the driving force from the engine 20 to the compressor device 100.

In this embodiment, the electromagnetic clutch 600 and the control unit 601 constitute the power transmission control device.

(Third Embodiment)

Figure 5:
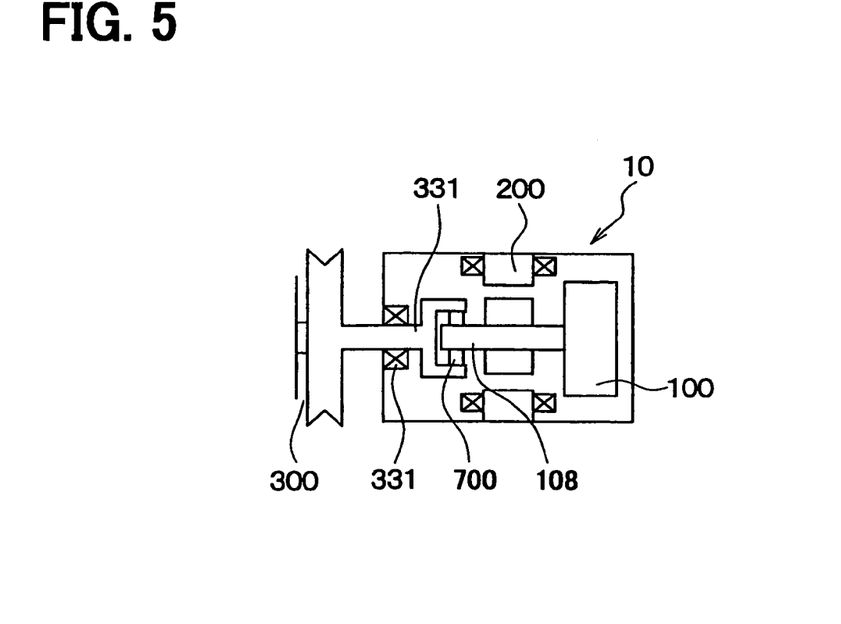
FIG. 5 is a schematic diagram showing a fluid machine according to a third embodiment of the present invention.

The third embodiment shown in FIG. 5 is a modification of the above explained second embodiment, in which a one way clutch 700 is arranged between the first and second shafts 331 and 108, instead of the electromagnetic clutch 600.

According to this embodiment, the transmission of the driving force is likewise allowed from the shaft 331 to the shaft 108 and the transmission of the rotational force in the reversed direction (from the shaft 108 to the shaft 331) is cut off by the one way clutch 700.

(Other Embodiments)

The expansion-and-compressor device 100 of the scroll type can be also replaced by any other type of expansion and compressor devices, such as a rotary type, a piston type, a vane type and so on.

Although the collected waste heat energy from the engine is converted into the electric power by the expansion-and-compressor device 100 and charged in the battery in the above embodiment, the collected energy can be converted into mechanical energy, for example, into kinetic energy by a flywheel, or into elastic potential energy by springs.

The fluid machine should not be limited to the use for the automobile compressor device having Rankine cycle.

In the above embodiments, the single device is used for performing two functions, one of which is to convert the internal energy of the working fluid into the rotational energy by expanding the superheated steam in the isentropic manner and the other of which is to compress the working fluid. The present invention, however, shall not be limited to the single device. For example, the fluid machine may be provided with two independent devices, one of which is a device for converting the internal energy of the working fluid into the rotational energy by expanding the superheated steam in the isentropic manner and the other of which is another device for compressing the working fluid.

What is claimed is:

1. A fluid machine comprising:
    a housing;
    a driving device air-tightly housed in the housing and having a function of an expansion device for collecting heat energy from working fluid and converting the collected heat energy into mechanical rotational energy, the driving device further having a function of a compressor device when the driving device is operatively driven by a rotational force from an outside driving source;
    a switching device for switching an operational mode of the driving device from the expansion device to the compressor device or vice versa;
    a driven means comprising an electric rotating device and air-tightly housed in the housing, the electric rotating device being operatively connected to the driving device and being driven by the mechanical rotational energy from the driving device to generate an electric power when the device is operating as the expansion device;
    a first driving shaft rotationally supported by the housing and operatively connected at its one end to the outside driving source and at its other end to the driving device for transmitting driving force from the outside driving source to the driving device;
    a second shaft operatively connected to both the driving device and the driven means, so that the power transmission from the driving device to the driven means and vice versa is selectively performed;
    a shaft seal device provided on the first driving shaft for air-tightly sealing the inside of the housing from the outside of the housing; and
    a power transmission control device operatively provided in a path between the first driving shaft and the second shaft, so that power transmission from the second shaft to the first driving shaft is cut off.

2. A fluid machine according to claim 1, wherein the power transmission control device comprises:

a one way clutch provided on the first driving shaft; and a planetary gear mechanism provided between the first driving shaft and the second shaft.

3. A fluid machine according to claim 2, wherein the first driving shaft is connected to a planetary carrier supporting planetary gears, and the second shaft is connected to a ring gear of the planetary gear mechanism.

4. A fluid machine according to claim 1, wherein the power transmission control device comprises an electromagnetic clutch provided between the first driving shaft and the second shaft.

5. A fluid machine according to claim 1, wherein the power transmission control device comprises a one way clutch provided between the first driving shaft and the second shalt.

6. A fluid machine according to claim 1, wherein the electric rotating device generates a rotational force when electric power is supplied thereto, wherein the rotational force is applied to the second shaft.

7. A fluid machine according to claim 1, wherein the electric rotating device is arranged in a path of transmitting the driving force at such a point closer to the driving device than the power transmission control device.

8. A fluid machine for a motor vehicle comprising:

a housing;

a pulley rotationally supported by the housing and operatively connected to an internal combustion engine for the motor vehicle;

an electric rotating device air-tightly housed in the housing and having a function for generating electric power when it is operated as an electric power generator and a function for generating a rotational force when it is operated as an electric motor;

an expansion-and-compressor device air-tightly housed in the housing and having a function for collecting waste heat from the internal combustion engine and generating a mechanical rotational force from the collected waste heat when it is operated as an expansion device, and a function for compressing a refrigerant for a refrigerating cycle for the motor vehicle when it is operated as a compressor device;

a first driving shaft rotationally supported by the housing and operatively connected at its one end to the pulley through an electromagnetic clutch;

a second shaft rotationally supported by the housing and operatively connected to the expansion-and-compressor device and to the electric rotating device, so that the power transmission from the expansion-and-compressor device to the electric rotating device and vice versa is selectively performed;

a shaft seal device provided on the first driving shaft for air-tightly sealing the inside of the housing from the outside of the housing; and a power transmission control device operatively provided in a path between the first driving shaft and the second shaft, so that the driving force from the engine can be transmitted to the expansion-and-compressor device when the electromagnetic clutch is energized, while the rotation of the first driving shaft in the reversed direction is restricted.

9. A fluid machine according to claim 8, wherein the power transmission control device comprises:

a one way clutch provided on the first driving shaft (331); and a planetary gear mechanism provided between the first driving shaft and the second shaft.

10. A fluid machine according to claim 9, wherein the first driving shaft is connected to a planetary carrier supporting planetary gears, and the second shaft is connected to a ring gear of the planetary gear mechanism.

11. A fluid machine according to claim 8, wherein the power transmission control device comprises an electromagnetic clutch provided between the first driving shaft and the second shaft.

12. A fluid machine according to claim 8, wherein the power transmission control device comprises a one way clutch provided between the first driving shaft and the second shaft.

13. A fluid machine according to claim 1, further comprising:

an outlet port provided in the housing for discharging compressed high-pressure working fluid, when the driving device is operated as the compressor device;

an inlet port provided in the housing for sucking high-pressure working fluid, when the driving device is operated as the expansion device;

a discharge valve for opening the outlet port so that the compressed high-pressure working fluid can be discharged from the outlet port; and a spool valve provided in the housing for opening and closing the inlet port, wherein the spool valve is operated by the switching device so that the inlet port is opened when the driving device is operated as the expansion device in order that the high-pressure working fluid is supplied into the driving device.

14. A fluid machine according to claim 1, wherein the driving device comprises a scroll type compressor, wherein a rotational direction of the driving device when it is operated as the expansion device is reversed from a rotational direction thereof when it is operated as the compressor device.

* * * * *